United States Patent

[11] 3,628,274

| | | |
|---|---|---|
| [72] | Inventor | Charles P. Wojahn<br>Holland, Mich. |
| [21] | Appl. No. | 848,197 |
| [22] | Filed | Aug. 7, 1969 |
| [45] | Patented | Dec. 21, 1971 |
| [73] | Assignee | Charles William Wojahn<br>Holland, Mich.<br>a part interest |

[54] TEMPERATURE-SENSING SYSTEM FOR PLACEMENT OF FISHING LURES
4 Claims, 16 Drawing Figs.

[52] U.S. Cl. .................................................. 43/43.12,
43/4, 43/43.15, 43/42.22
[51] Int. Cl. ...................................................... A01k 95/00,
A01k 97/00

[50] Field of Search ............................................. 43/4, 43.12

[56] References Cited
UNITED STATES PATENTS

| 2,749,649 | 6/1956 | Fitzsimmons.................. | 43/43.12 |
| 3,031,788 | 5/1962 | Shannon........................ | 43/4 |

*Primary Examiner*—Melvin D. Rein
*Attorney*—Glenn B. Morse

ABSTRACT: A weighted device releasably holding a fishline near the lure, incorporating a temperature sensor for reading the exact temperature of the water in which the lure is moving, regardless of the length of the line payed out, or the line attitude.

PATENTED DEC 21 1971 3,628,274

INVENTOR.
Charles P. Wojahn
BY
*Glenn B. Evans*
ATTORNEY

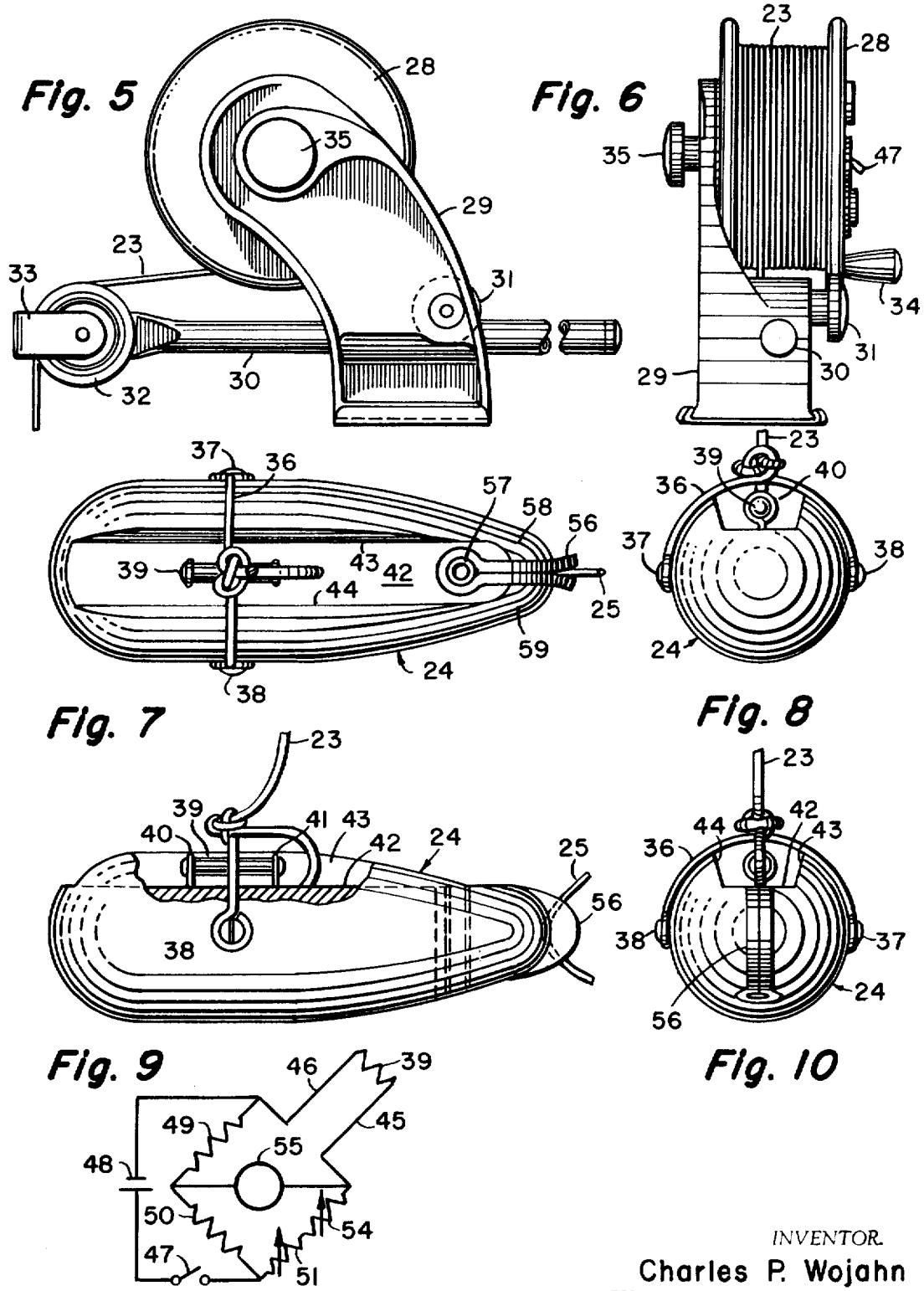

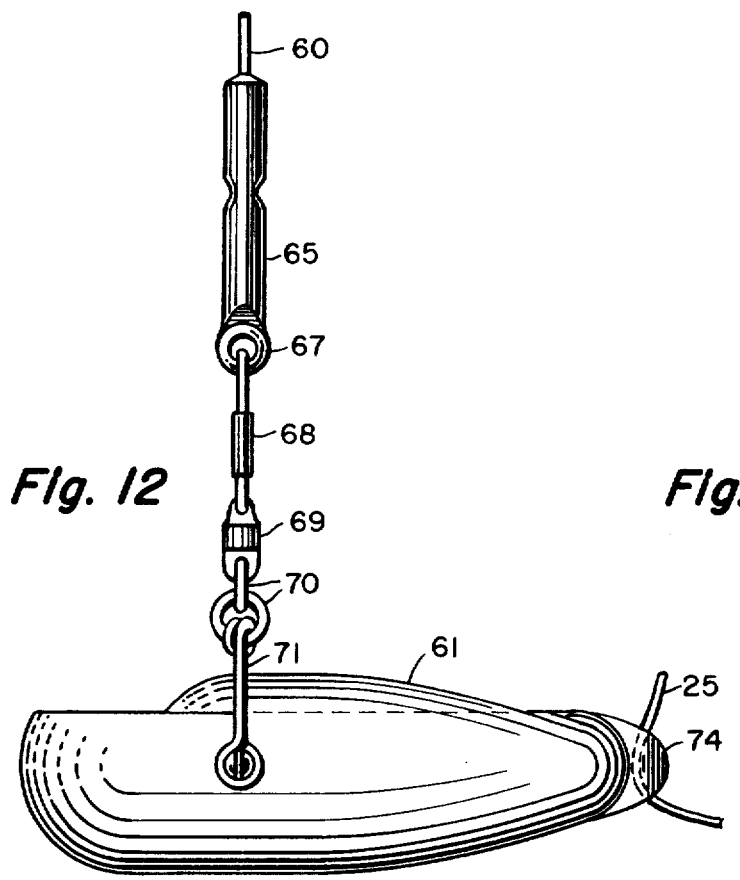
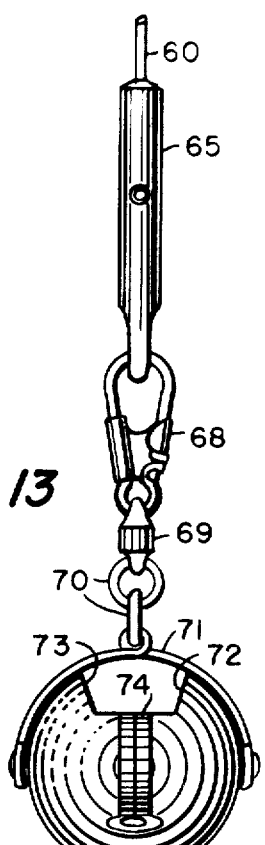
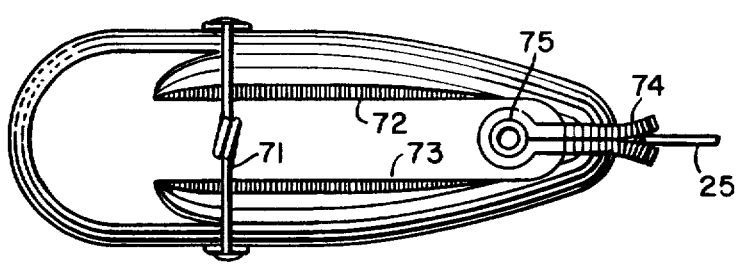
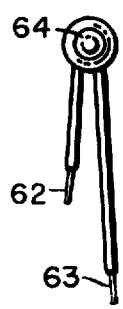
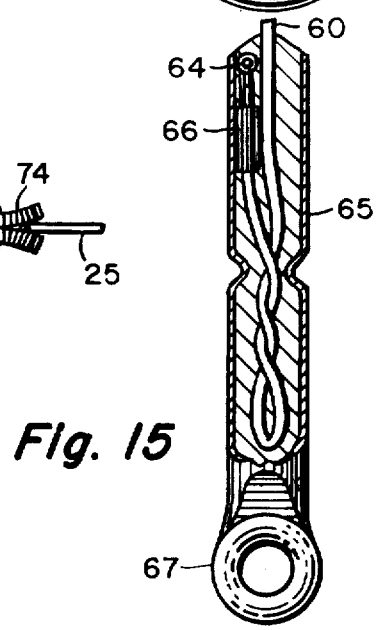

TEMPERATURE-SENSING SYSTEM FOR PLACEMENT OF FISHING LURES

BACKGROUND OF THE INVENTION

Remote temperature-sensing devices are in general use in a variety of applications. Many of these are based upon the action of a so-called "thermistor," which is essentially an electrical resistor in which the resistance varies as a function of the temperature of the environment in which the unit is placed. This device can be placed in a conventional wheatstone bridge circuit as one leg of the usual interrelated pattern of resistors. Variation in temperature in the area surrounding the thermistor will then throw the bridge circuit out of balance to a degree that can be read out by a conventional meter device. These units are used for remote indication of temperatures under practically every circumstance imaginable, including use in conjunction with fishing.

The usual procedure for detecting the temperature at various levels below the surface of the water is to stop the boat and pay out a given length of line, and then read the temperature at that particular depth with the boat stopped. This information will give some suggestion as to how far down it becomes necessary to go in order to arrive at the particular temperature known to be associated with certain fish. The obvious problem here is that a resumption of motion of the boat makes it necessary to estimate the amount of line that should be payed out to the positioning weight to which the fishline is secured, with correct compensation being necessary for (a) the speed of the boat, (b) the resistance of a particular fishline and weight-suspension cable to movement through the water, and (c) any deviation from a straight line between the boat and the positioning weight. It is obvious that these variables render the depth estimate a very approximate guess, with variations in the speed of the boat (as with a head wind) rendering the position of the lure a continuing variable. These conventional temperature-sensing devices have been structurally independent, and used independently, of the equipment that positions the lure.

SUMMARY OF THE INVENTION

This invention provides for the placement of a temperature-sensing device in the immediate proximity of the weight responsible for the placement of the lure. The usual weight is provided with a clip that releasably holds the fishline, with the suspension of the weight being from a line or cable independent of the fishline. This arrangement permits the strike of the fish to pull the fishline free from the clip so that the handling of the fish does not have to be subject to the burden of the placement weight. The fishline is usually clipped onto the weight a few feet from the lure, so that the lure streams directly back from the weight. The temperature at the weight is therefore essentially the same as that surrounding the lure as it moves through the water. This temperature indication is obviously not subject to the variations in the curvature of the suspension line supporting the weight, the speed of the boat, or the length of line payed out. The temperature indication reads exactly where the lure is, and the line can simply be payed out until the desired temperature reads on the instrument mounted in the boat. One modification of the invention involves the mounting of a sensing device directly on the weight, and a modified form incorporates the sensor in a member forming a continuation of the weight-support cable, in that the cable tension is transferred through the member.

DESCRIPTION OF THE DRAWINGS

In the drawings:

FIG. 5 is a side view opposite to that from FIG. 2.

FIG. 6 is a rear view opposite to FIG. 3.

FIG. 7 is a top view of the lure-positioning weight.

FIG. 8 is a front view of the weight shown in FIG. 7.

FIG. 9 is a side elevation, partially in section, showing the mounting of a thermistor on the weight, and showing the releasable engagement of the weight with the fishline.

FIG. 10 is a rear view of the assembly shown in FIG. 9.

FIG. 11 is a schematic circuit diagram showing the temperature-indicating system.

FIG. 12 shows a modified form of the invention in which the temperature sensor is incorporated as a continuation of the cable supporting the positioning weight.

FIG. 13 is a rear view with respect to FIG. 12.

FIG. 14 is a top view of the weight shown in FIG. 12.

FIG. 15 is a view on an enlarged scale, in transverse section, showing the temperature-sensing unit incorporated in FIGS. 12 and 13.

FIG. 16 is a view of the thermistor used in the FIG. 15 assembly.

DESCRIPTION OF THE PREFERRED EMBODIMENTS

Figure 1:
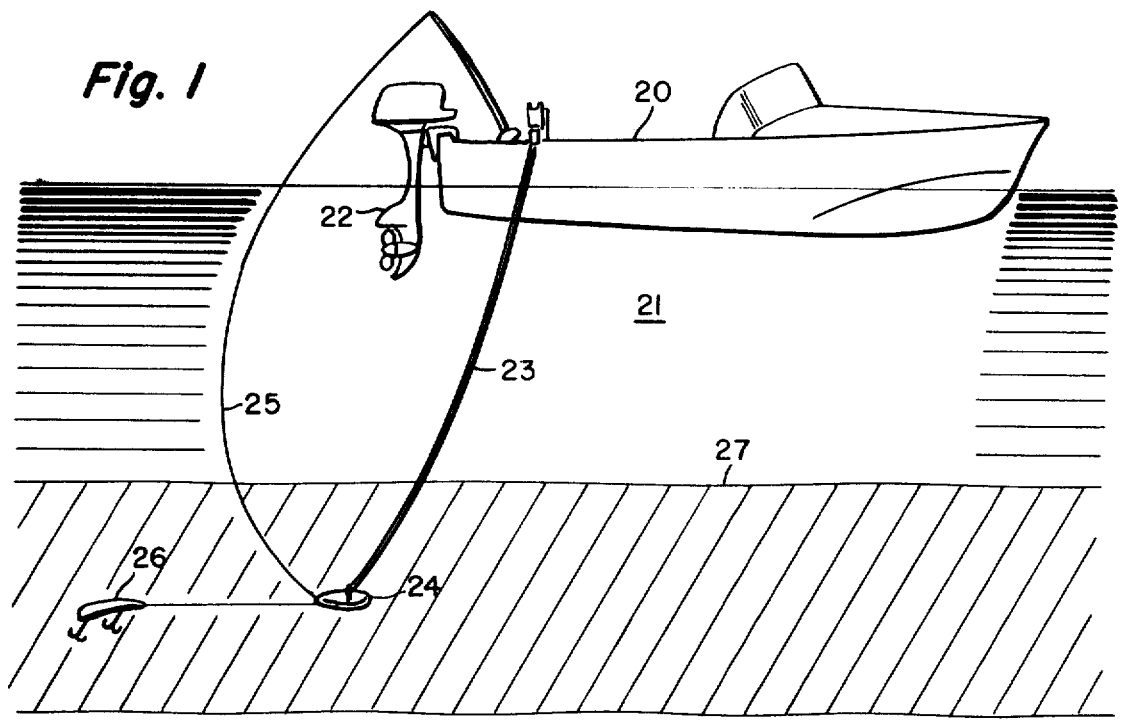
FIG. 1 is a schematic view illustrating the relationship of the various components of the system in conjunction with a conventional boat of the type commonly used in fishing.

Referring to FIG. 1, the boat 20 is shown moving through the water 21 under the action of the motor 22. A ballast structure including a cable 23 and positioning weight 24 has a clip fixed to the positioning weight for releasably retaining a fishline 25 a few feet ahead of the lure 26. The strata of water indicated at 27 has been determined (through the use of the present invention) as having the temperature characteristics associated with the particular type of fish that are desired. For example, bass are known to prefer a temperature range between 65° and 75° F., pike between 50° and 70°, salmon around 50° to 53°, and lake trout somewhere between 40° and 50°. Frequently, surveys will be maintained by governmental or private efforts that will publish current data on the temperature range within which the fish are known to exist. With this information at hand, it is possible to pay out a sufficient quantity of cable 23 to position the weight 24 at a temperature reading which will cause the lure 26 to move exactly within the desired strata of water 27 corresponding to the known data.

Referring to FIGS. 2 through 10, the reel 28 is rotatably mounted in the bracket 29 secured in any convenient fashion to the side or interior structure of the boat 20. The bracket 29 also receives the tubular beam 30 in axially slidable relationship, with the position of the beam 30 being lockable by a clamping screw controlled by the handle 31. The pulley 32 is rotatably mounted in the outer end of the beam 30, through the equivalent of a bracket formed by a flattened portion 33 at the end of the tube. The cable 23 is payed out by the reel 28 over the pulley 32, under the control of the reel handle 34. A conventional reel brake is controlled by the handle 35, so that the desired amount of line can be maintained without the necessity of holding the handle 34.

Referring particularly to FIGS. 7 through 10, the positioning weight 24 is provided with a bail 36 of heavy wire, secured at its opposite ends to the weight with the fastenings 37 and 38. A thermistor 39 is mounted on the supports 40 and 41 secured to the base 42 of a groove in the weight 24 defined by the sidewalls 43 and 44. The cable 23 includes a pair of small wires attached to the opposite leads 45 and 46 of the thermistor 39, and these leads form the association between the thermistor and the bridge circuit shown in FIG. 11.

Figure 2:
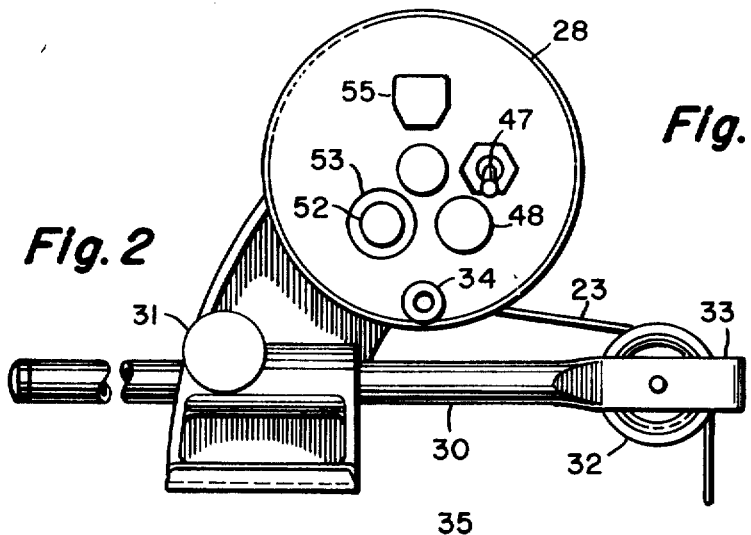
FIG. 2 is a view on an enlarged scale over that of FIG. 1, showing a side elevation of the cable reel incorporating the circuit components of the temperature-indicating system.
Figure 3:
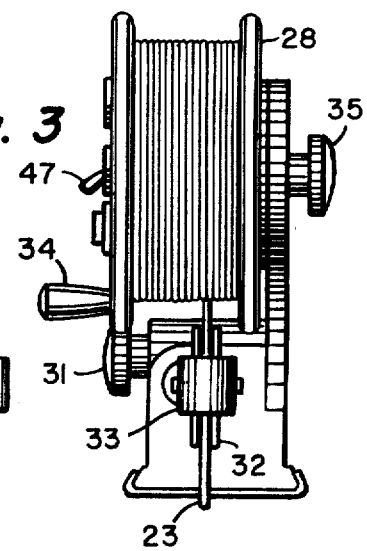
FIG. 3 is a front view of the device shown in FIG. 2.
Figure 4:
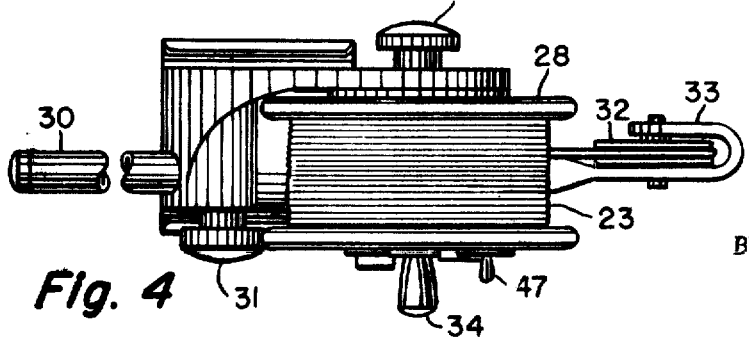
FIG. 4 is a top view of the device shown in FIG. 2, FIGS. 2, 3, and 4 being in projection.

The indicating systems for reading out the data sensed by the thermistor 39 is mounted within the reel 28, in a relationship best shown in FIG. 2. The space within the reel is utilized for accommodating the standard components constituting the bridge circuit shown in FIG. 11. An off-on switch 47 controls a circuit powered by the battery insert 48, which would normally supply about 1½ volts. A fixed resistor 49 provides approximately 1,000 ohms resistance, and the fixed resistor 50 approximately 500 ohms. A variable potentiometer 51 is controlled by the handle 52, the position of which reads against a convenient dial 53. A trimming potentiometer 54 is incorporated in the same leg of the bridge circuit with the potentiometer 51, and can be used to calibrate the device. A null indicator 55 reads out the condition of the bridge circuit at any given time, and displacement from null position will give a fine reading related to the position of the potentiometer 51. The components of the bridge circuit are conveniently pushed through holes in the side of the reel 28, with the mounting arrangements then being secured to place them in the relationship shown in FIG. 2. The temperature read by the system shown in FIG. 11 will give a clear indication of the condition of the water surrounding the lure 26.

The fishline 25 is releasably held by the placement weight so that a strike by a fish will pull the line 25 free from its temporary retention. The clip arrangement is best shown in FIG. 7, and is based on a flap 56 of rubberlike material folded into the illustrated condition, and shoved into a slot in the rear end of the weight 24. This slot has an enlargement at its forward extremity, so that peg 57 can be shoved in place after the flap 56 has been placed in position. If it is desired to increase the tightness of the grip, the portions of the weight indicated at 58 and 59 may be pounded gently with a hammer, or rapped against the side of the boat, to slightly decrease the width of the slot which receives the flap 56. If the retention is already too severe, a blade of some type can be asserted between the two sides of the flap 56 so that they can be pried apart.

Referring to FIGS. 12 through 16, the weight-suspension cable 60 is equivalent to the cable 23 discussed previously. This cable not only supports the positioning weight 61, but also contains wires equivalent to the leads 45 and 46. These wires are respectively connected to the leads 62 and 63 of the modified thermistor 64 shown in FIG. 16, as best shown in FIG. 15. The connected assembly is "potted" in a mixture of epoxy and aluminum oxide to produce a solid mass capable of transferring the tensile forces in the cables 60 through the adhesive action of the mass to the tubular member 65. The preferred arrangement for completing this assembly is to loop the end of the cable 60 as shown in FIG. 15, and open the ends of the cable to expose the two contained wires. These are cut to offset lengths to correspond to the similar offset shown in FIG. 16, and the respective leads are soldered together. A protective shield 66 over the connection may be incorporated, if desired. A quantity of semiliquid epoxy filled with the aluminum oxide is placed in the tubular member 65, and the electrical assembly shoved into the illustrated position, with the thermistor 64 near the upper surface of the potting material. The filling of the aluminum oxide tends to increase the heat-transfer characteristics of the potting material, and the position of the thermistor adjacent the surface minimizes the thermal delay involved in the sensing device with respect to the surrounding environment. The lower extremity of the tubular member 65 is pinched together and provided with a grommet 67, which is coupled through the safety pin-type connector 68 and the swivel 69 to the ring 70 engaging the bail 71 secured to the weight 61.

The form of the weight 61 is somewhat different from that of the weight 24, in that the material defining the central groove has been cut away at the forward portion so that the groove terminates nearer the bail 71. The bail corresponds approximately to the position of the center of gravity of the weight, and the presence of the spaced sidewalls 72 and 73 extending primarily to the rear of the center of gravity provides a directional stability to the weight that is improved over the case where the walls extend completely to the forward extremity of the weight, as shown in FIG. 7. The rubberlike flap 74 and the retaining plug 75 are equivalent to the corresponding items 56 and 57 shown in FIG. 7, and the retention of the fishline 25 is the same.

I claim:

1. In fishing ballast structure including a cable, a weight secured to one end thereof for positioning a fishing lure secured to a fishing line and a releasable fishline-retaining clip fixed to said weight, the improvement comprising;

a temperature sensor mounted on said ballast structure in close proximity to said weight;

indicating means disposed at a position remote from said weight, and adapted to read out the conditions detected by said sensor; and electric circuit wires incorporated in said cable and connected to said sensor and said indicating means.

2. A device as defined in claim 1, wherein said sensor is a thermistor, and said indicating means includes a bridge circuit incorporating said thermistor in one leg thereof.

3. A device as defined in claim 1, wherein said sensor is mounted in a groove on said weight.

4. A device as defined in claim 1, wherein said sensor is mounted on a member connected to said cable as a continuation thereof for transmission of cable tension.

* * * * *